United States Patent [19]
Richter

[11] Patent Number: 6,148,738
[45] Date of Patent: Nov. 21, 2000

[54] STEERING WHEEL MOUNTABLE LAPTOP TABLE

[76] Inventor: Herbert Richter, Drosselweg 8, 75331 Engelbrand, Germany

[21] Appl. No.: 09/394,662

[22] Filed: Sep. 13, 1999

[51] Int. Cl.[7] .................................................. A47B 23/00
[52] U.S. Cl. ................................................. 108/44; 108/47
[58] Field of Search ................................. 108/44, 43, 42, 108/47, 152

[56] References Cited

U.S. PATENT DOCUMENTS

| | | | |
|---|---|---|---|
| 3,386,392 | 6/1968 | Gramm | 108/44 |
| 4,570,803 | 2/1986 | Peterson | 108/47 X |
| 4,792,163 | 12/1988 | Kulle | 108/44 X |
| 5,370,060 | 12/1994 | Wang | 108/44 |
| 5,511,493 | 4/1996 | Kanehl, Jr. | 108/44 |
| 5,953,999 | 9/1999 | Kanehl | 108/44 |

*Primary Examiner*—Jose V. Chen
*Attorney, Agent, or Firm*—Klaus J. Bach

[57] ABSTRACT

In a laptop table adapted to be mounted on a steering wheel, a basic body has at one end spaced hooks forming a support structure for supporting the base body on the steering wheel and a table is mounted on the base body so as to be height adjustable and pivot structure are provided for pivotally supporting the table on the base body and locking it in a particular angular pivot position with respect to the base body.

6 Claims, 6 Drawing Sheets

STEERING WHEEL MOUNTABLE LAPTOP TABLE

BACKGROUND OF THE INVENTION

The invention relates to a steering wheel mountable table for supporting objects, especially a laptop computer.

The driver of a vehicle often encounters the problem that he or she has no support for conveniently placing objects when pausing on the road for example to take some notes or to input into, or retrieve, information from a portable computer (laptop). Without support structure, the driver needs to place the lap top onto the legs whereby operation of the lap top becomes inconvenient and the picture on the screen of the lap top becomes difficult to see.

A portable steering wheel mountable computer table is known for example from U.S. Pat. No. 5,749,306. In this design, the table top 10 is at a given position and angle relative to the steering wheel. This is certainly not convenient for all drivers and not appropriate for all vehicles as vehicle space, vehicle seating positions, steering wheel angles are different and, of course, the body statures of various drivers are different.

It is therefore the object of the present invention to provide a steering wheel mountable lap top table whose position is adjustable to fit any vehicle and any personal taste and which can be easily folded to fit into a small space for example under a car seat.

SUMMARY OF THE INVENTION

In a laptop table adapted to be mounted on a steering wheel, a basic body has at one end spaced hooks forming a support structure for supporting the base body on the steering wheel and a table is mounted on the base body so as to be height-adjustable and pivot means are provided for pivotally supporting the table and locking it in a particular angular pivot position with respect to the base body.

The steering wheel mounting structure on the base body preferably comprises two spaced hooks whereby the base body is accurately positioned on the steering wheel. The table, which is height-adjustably supported on the base body, is also angularly adjustable so that the driver can select any convenient angle for the table supporting the laptop computer. Height adjustment is simple and the mechanism is very sturdy so that dust and dirt that may be present in a storage area such as under a seat will not detrimentally affect operation of the steering wheel mountable laptop table according to the invention.

It has been found that, for normally sized steering wheels as they are generally present in cars, the distance between the spaced hooks should be about 13 cm. With such a hook distance, the base body is not only safely supported on the steering wheel but unintentional pivoting of the base body on the steering wheel will not occur.

Preferably, the surface area of the hooks and of the base body which come into contact with the steering wheel are provided with a resilient slide-resistant material layer such as foam rubber. In this way, the base body engages the steering wheel in a firm manner and, furthermore, scratching of the steering wheel surface is prevented.

Since the table is height adjustable, a user may adjust the height of the table for greatest typing comfort. This is, important insofar as typing errors can be avoided in this way. An inconvenient height of the table will always result in typing errors. It is also important that, at the proper height, the picture on the screen of the computer is clearly visible as laptop computers are designed for a certain angular position relative to the user. If viewed at other angles, the flat-screen picture of a laptop computer is difficult to see.

In a preferred embodiment, the base body has an elongated opening and the table has a guided member projecting therefrom through the elongated opening. The guided member has projections extending in opposite directions in front of, and behind, the elongated opening so that the guided member can be clamped into engagement with the base body in a simple manner by tilting.

Since the clamping forces are generated by the tilting of the guided member, which is connected to the table, the clamping forces increase when the force effective on the table, that is the weight on the table, increases. With the weight of a computer on the table, the guide member is firmly engaged with the base body.

Since the guided member and, together therewith, the table is connected to the base body by a clamping structure, the table can be easily arranged at different support levels. This is particularly advantageous since the freedom of movement in a car is quite limited. Simple adjustment arrangements greatly facilitate the use of the adjustable lap top table.

It has been found to the particularly advantageous if the projections at opposite sides of the guide member are bolts, which are mounted on the guided member. Such an arrangement is, on one hand, quite inexpensive and, on the other hand, provides for a reliable insensitive support structure. While the guided member and the base body may consist, for example, of plastic material the bolts may consist of metal, particularly of aluminum.

In another embodiment of the invention, the base body has recesses formed therein in longitudinally spaced relationship along the elongated opening (slot) of the base body. The recesses are sized and shaped so as to snugly receive the bolts, which, upon tilting of the guide member, enter the recesses. In this way, the bolts are form-fittingly engaged with the base body when the base body is tilted into the desired position. Also a stepped engagement pattern is provided which often facilitates the selection of the position of the table. Again, the engagement is easily released by back tilting of the table (upward tilting). When engaged with the base body, however, the guided member and the table are firmly supported by the base body.

It is furthermore quite advantageous that the angle of the table relative to the base body and, consequently, relative to the steering wheel is adjustable. This is achieved by mounting the table to the guided member in a pivotable fashion by a pivot joint which is in the form of a clamping joint. Preferably, the clamping joint is a rapidly operable clamping joint by way of which the angle can be rapidly adjusted to the desired degree.

The table is preferably provided with a slide resistant surface covering at least parts of the support area. In this way, a laptop computer is safely supported which facilitates operation of the laptop. The slide resistant surface may consist for example, of strips of foam rubber, disposed along two opposite edges of the table.

Further features and advantages of the present invention will become apparent from the following description on the basis of the accompanying drawings.

DESCRIPTION OF A PREFERRED EMBODIMENT

Figure 1:
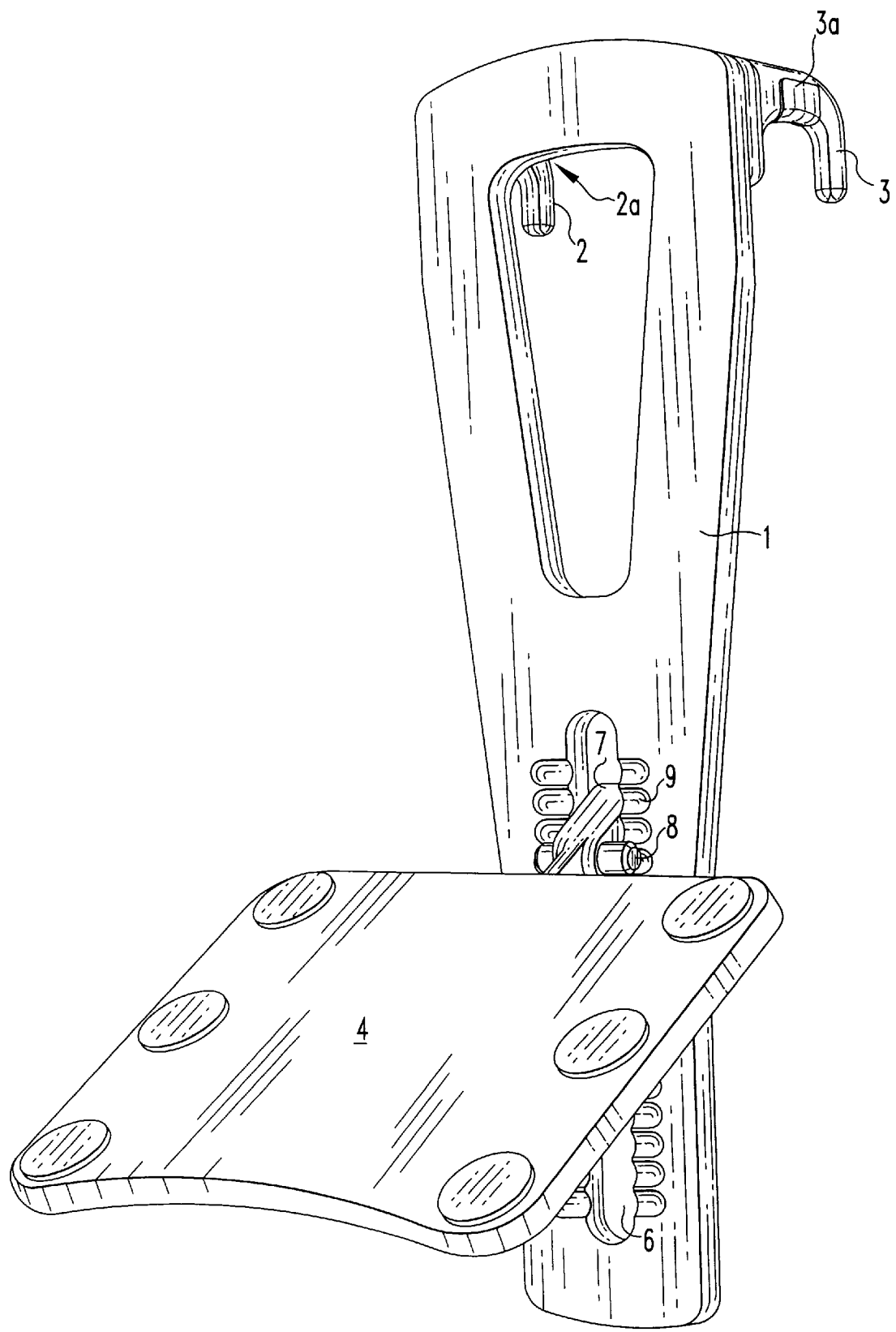
FIG. 1 is a perspective view of the steering wheel mountable lap top table according to the invention.

As shown in FIG. 1, the steering wheel mountable laptop table comprises a base body 1 having at its upper end two spaced hook structures 2, 3. The distance between the hooks is about 13 cm. At their curved upper inner surface which is to be disposed on a steering wheel, the hook structures are provided with slide resistant layers 2a, 3a preferably of foam rubber (see FIG. 2).

At its end opposite the hooks 2, 3, the base body 1 includes an elongated opening 6. Spaced recesses 9 are provided in the base body 1 along the longitudinal opposite edges defining the elongated opening 6. However, the recesses 9 may alternatively be arranged at the backside of base body 1. The recesses 9 are trough-shaped.

Figure 2:
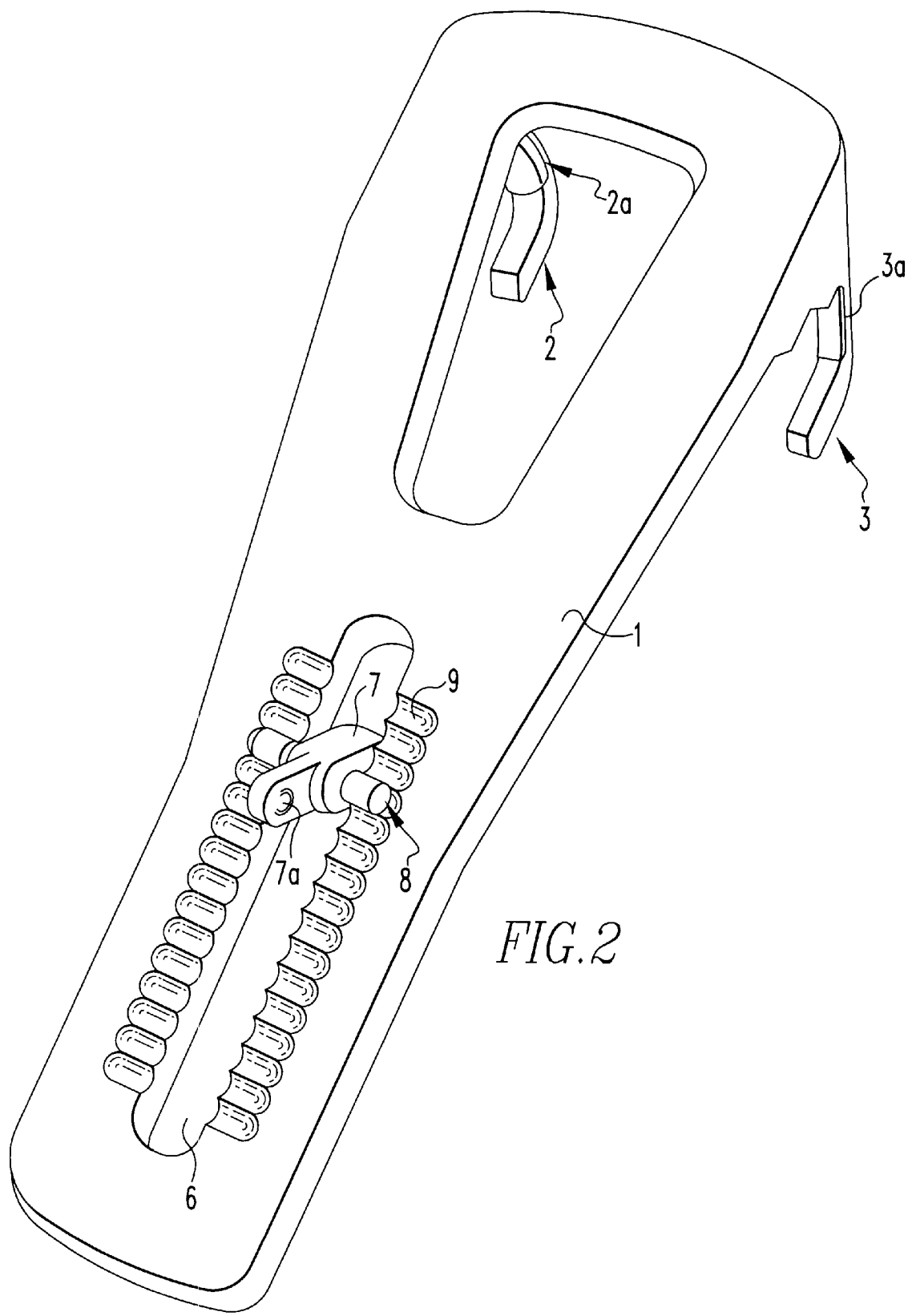
FIG. 2 shows the base body and the guided member, on which the table is mounted.
Figure 4:
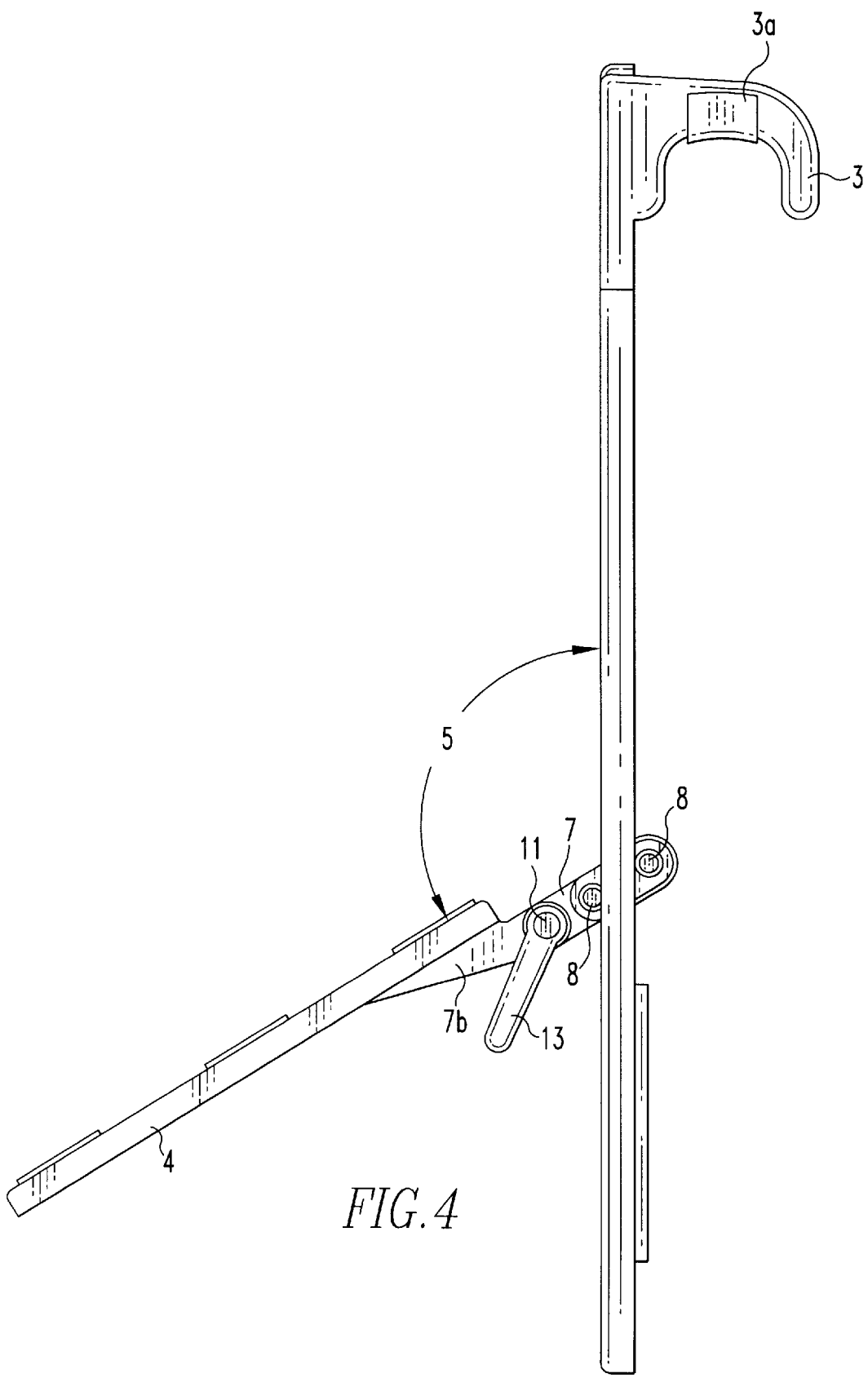
FIG. 4 is a side view of the steering wheel mountable lap top table.

A guided member 7 extends through the elongated opening 6 and has projections 8 arranged at opposite sides of the base body 1 so as to extend in opposite direction from the guide member. One set of projections is disposed in front of the base body and another set of projection is disposed behind the base body 1 as seen in FIGS. 1, 2 and 4. The front set of projections 8 is received in a set of recesses 9.

The rear set of projections 8 engages the rear surface of the base body 1 when the guide member is pivoted down so as to firmly hold the front set of projections in a selected set of recesses. The projections 8 are preferably formed by bolts extending transversely through the guided member 7. The diameter of the bolts corresponds to the size of the throughlike recesses 9.

The sets of projections 8 of the guided member 7 are so spaced from each other that the thickness of the base body 1 can be accommodated in between and that there is some additional space to permit sliding of the guide element 7 along the elongated opening 6 when the guided member is tilted to a pivot position in which a plane receiving the axes of both sets of projections extends normal to the base body.

Figure 3:
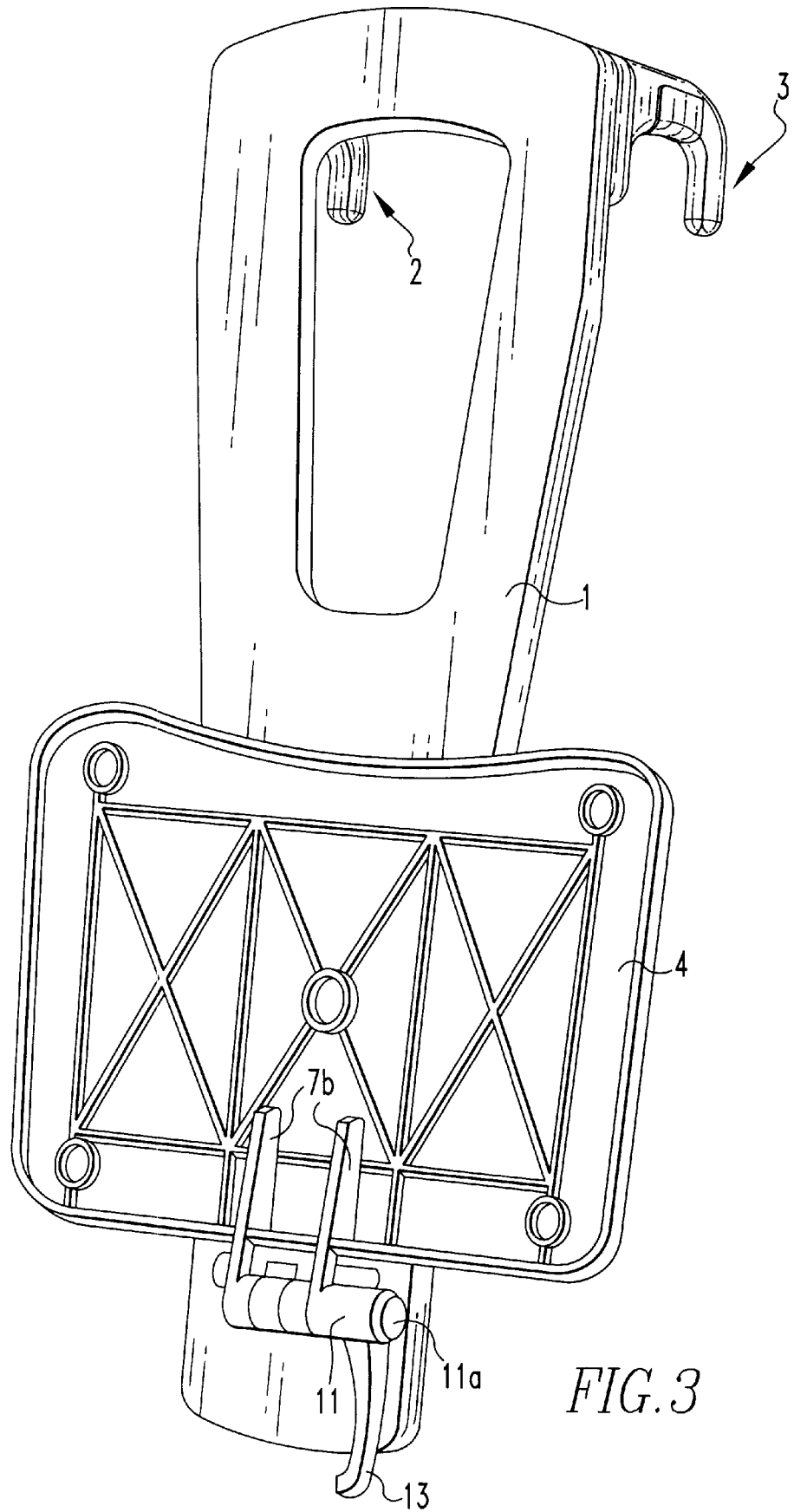
FIG. 3 shows the arrangement of FIG. 1 with the table folded into the base body.

At its front end, the guided member 7 includes a joint by way of which the table 4 is pivotally supported. The joint is formed by an opening 7a in the guided member 7 and correspondingly spaced support arms 7b extending from the table 4 between which the end of the guided member 7 is received and through which a bolt extends. The joint, which forms a rapid adjustment clamping joint 11 will be described in greater detail later. As shown in FIG. 3, the table can be pivoted up against the base body 1 so that it is disposed directly adjacent, and parallel to, the base body 1. In this position, the steering wheel mountable laptop table takes up little space and can easily be stored, for example, under a seat.

Figure 5:
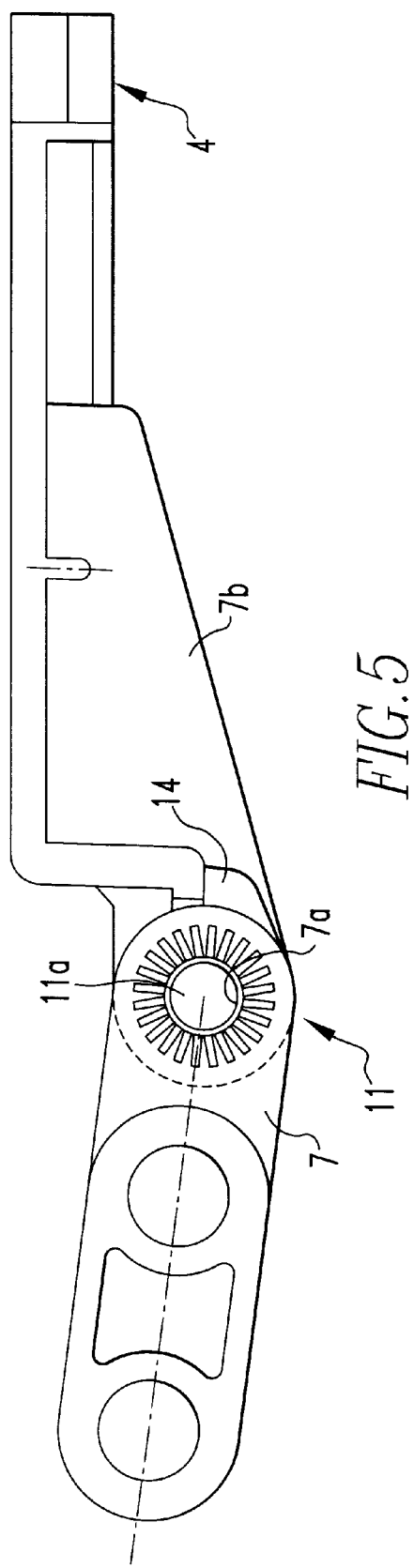
FIG. 5 shows the clamping joint by which the table is pivotally mounted to the base body.

The pivot joint is shown in detail in FIG. 5. The guided member 7 has at its front end an opening 7a around which recesses and projections are arranged in a star-like fashion. Corresponding radial recesses and projections are provided in the end portions of the spaced support arms 7b between which the front end of the guided member 7 is received. The spaced support arms 7b have openings in alignment with the opening 7a and a bolt 11a extends through the openings to pivotally join the guided member 7 and the support arms 7b. The bolt 11a is threaded and provided with a nut at one end thereof. At the other end, it has a grooved head and a lever having a grooved inner surface engaging the grooved head to permit rotation of the bolt by the lever. The lever is axially movably supported on the bolt head to permit its disengagement from the bolt head to permit a ratchet action. The angle 5 of the table 4 relative to the base body 1 is adjustable by pushing back the handle 13 of the rapid adjustment joint 11. Then the bolt 11a is loosened so that the table 4 can be pivoted to any desired position between its lower end position and its upward end position adjacent the base body 1. When the table is in a desired angular position, the handle 13 is moved in the opposite direction to firmly hold the table in the desired angular position. The lower end position is determined by the stop 14 which limits downward pivoting of the table 4 to an angle 5 of about 110° relative to the base body 1 to prevent a laptop from sliding from the table.

Figure 6:
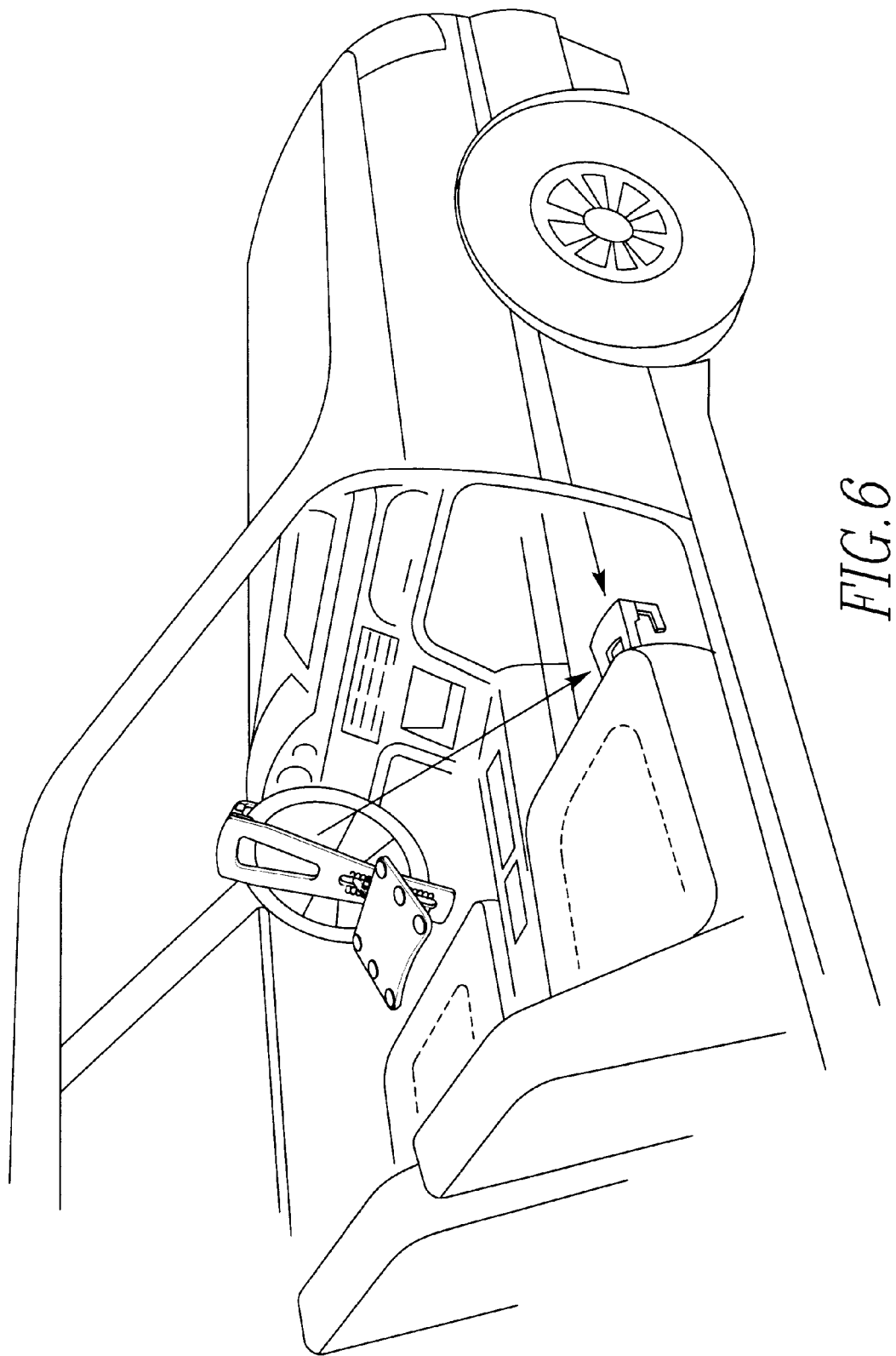
FIG. 6 shows the lap top table supported on a steering wheel of a car.

The device according to the invention can easily be supported on the steering wheel of a vehicle as shown in FIG. 6. If the device is not used, it can be folded together as shown in FIG. 3 and can be stored in a small space, for example, under a seat of the vehicle as indicated in FIG. 6.

What is claimed is:

1. A laptop table for mounting on a steering wheel of a motor vehicle, comprising: a base body having at one end spaced hooks forming a support structure for engaging the base body with the steering wheel, a table supported on said base body so as to be height adjustable and pivot means for pivotally supporting said table and locking said table in a particular angular pivot position with respect to the base body, said base body having an elongated opening and said table including a guided member extending through said opening, said guided member having projections at opposite sides of said base body so as to firmly engage said base body between said projections when said guided member is tilted relative to said base body.

2. A laptop table according to claim 1, wherein the space between said hooks is about 13 cm.

3. A laptop table according to claim 1, wherein said hooks are provided with soft slide resistant surface structures in the area where the hooks are in contact with the steering wheel when mounted thereon.

4. A laptop table according to claim 1, wherein said projections are bolts extending through said guided member.

5. A laptop table according to claim 1, wherein said base body has recesses disposed at opposite sides of said elongated opening for receiving said projections and firmly holding said table in engagement with said base body.

6. A laptop table according to claim 1, wherein at least portions of said table are provided with a slide-resistant surface layer.

* * * * *